United States Patent
Finney

(10) Patent No.: US 6,866,232 B1
(45) Date of Patent: Mar. 15, 2005

(54) AUTOMATED DOCKING OF SPACE VEHICLE

(75) Inventor: Richard Finney, Morrison, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/687,988

(22) Filed: Oct. 17, 2003

Related U.S. Application Data

(60) Provisional application No. 60/419,424, filed on Oct. 18, 2002.

(51) Int. Cl.$^7$ ................................................ B64G 1/62
(52) U.S. Cl. ................................................ 244/158 R
(58) Field of Search .......................... 244/158 R, 160, 244/161, 162

(56) References Cited

U.S. PATENT DOCUMENTS

| | | | | |
|---|---|---|---|---|
| 3,794,270 A | * | 2/1974 | Wilkens .................... 244/161 |
| 3,910,533 A | * | 10/1975 | Cheatham et al. .......... 244/161 |
| 4,260,187 A | * | 4/1981 | Frosch et al. .............. 294/86.4 |
| 4,664,344 A | * | 5/1987 | Harwell et al. ............. 244/161 |
| 4,764,668 A | | 8/1988 | Hayard ...................... 235/470 |
| 4,890,918 A | * | 1/1990 | Monford .................... 356/150 |
| 4,923,303 A | | 5/1990 | Lutz ......................... 356/375 |
| 5,005,786 A | | 4/1991 | Okamoto et al. ........... 244/161 |
| 5,109,345 A | * | 4/1992 | Dabney et al. ............. 701/226 |
| 5,334,848 A | | 8/1994 | Grimm ...................... 250/548 |
| 5,340,060 A | * | 8/1994 | Shindo ...................... 244/161 |
| 5,734,736 A | | 3/1998 | Palmer et al. .............. 382/103 |
| 5,806,802 A | * | 9/1998 | Scott ......................... 244/161 |
| 6,091,345 A | | 7/2000 | Howard et al. ............. 340/958 |
| 6,227,495 B1 | * | 5/2001 | Howard et al. ............. 244/161 |
| 6,254,035 B1 | | 7/2001 | Howard et al. ............. 244/161 |
| 6,330,987 B1 | * | 12/2001 | Scott ...................... 244/158 R |
| 6,360,995 B1 | | 3/2002 | Nygren, Jr. ................. 244/161 |
| 6,484,973 B1 | * | 11/2002 | Scott ......................... 244/161 |
| 6,504,610 B1 | | 1/2003 | Bauer et al. ................ 356/399 |
| 6,669,148 B2 | * | 12/2003 | Anderman et al. ......... 244/161 |
| 2004/0026571 A1 | * | 2/2004 | Scott ...................... 244/158 R |

* cited by examiner

*Primary Examiner*—Charles T. Jordan
*Assistant Examiner*—S Holzen
(74) *Attorney, Agent, or Firm*—Marsh Fischmann & Breyfogle LLP

(57) ABSTRACT

An automated docking system for space vehicles that includes a plurality of antennas on each of a target vehicle and a chase vehicle. A pseudo random code is transmitted via one of the antennas located on one of the vehicles and received by one of the antennas located on the other vehicle. The pseudo random code is then sent back to the original vehicle via transmissions from the plurality of antennas on the second vehicle and received by the plurality of antennas on the original vehicle. The distance from each of the antennas on the other vehicle to each of the antennas on the originating vehicle can be measured in this fashion. The antennas on each of the vehicles are located in a spaced-apart arrangement so that the angular orientation or attitude of each of the vehicles to each other can also be determined. A plurality of video cameras is provided on the exterior of one of the vehicles and video information from these cameras is transmitted to the other vehicle for display to operators in that vehicle. Commands between the vehicles can also be communicated.

24 Claims, 4 Drawing Sheets

AUTOMATED DOCKING OF SPACE VEHICLE

CROSS-REFERENCE TO RELATED APPLICATIONS

This application claims priority from U.S. Provisional Patent Application No. 60/419,424, filed Oct. 18, 2002, entitled "Transformable Space Vehicle Tractor Beam Equipment," the contents of which are incorporated herein by reference.

FIELD OF THE INVENTION

This present invention relates generally to techniques for use in docking space vehicles, and more particularly to techniques for use in an automated process of docking vehicles based on an exchange of RF signals between multiple antennas on each of the space vehicles.

BACKGROUND OF THE INVENTION

There is a continuing need to improve procedures for docking one space vehicle to another space vehicle. Once these space vehicles are in close proximity to each other, some current systems rely on a pilot in one of the vehicles who makes use of radar and/or vision systems while steering one of the vehicles relative to the other vehicle. Unfortunately, there are many factors that cause this procedure to be done in less than ideal conditions. First of all, the pilot is typically not able to directly view the portions of the vehicles that are being docked together, such as through a window. Instead, the pilot is typically viewing a radar or video display. In the case of a video display, the operator is viewing a two-dimensional image supplied by a camera while performing a three-dimensional operation. Further, the image quality may suffer due to lighting constraints. For example, the ambient sunlight may be blocked by the earth or by either vehicle. Alternatively, the camera may be looking toward the sun during the docking operation. Also, it is possible for the optics to become fogged due to moisture or contaminated due to chemical deposition, thus washing out the image.

Radar-assisted docking also has drawbacks. First of all, the pilot may not be as comfortable maneuvering the space vehicle while viewing only radar imaging as opposed to video imaging or direct viewing. Further, the measurement by the radar of range to the other vehicle, range rate, and direction may not be sufficiently precise. Also, there is typically not much in the way of attitude or angular orientation information available from radar imaging systems.

As an alternative to having the docking operation performed by a pilot in one of the vehicles, the docking operation could be performed by ground operators. Unfortunately, the transmission delays inherent in transmitting video, range, range rate, and direction information to the ground and then transmitting command and control information from the ground operator back to one of the space vehicles make such a procedure difficult. Any type of control loop would be negatively affected by such delays. Further, there are few opportunities for direct communication between the space vehicles and the ground operators. When direct communication from the space vehicle to the ground operators is not possible, then additional transmission delays are incurred due to satellite relays. Of course, these additional transmission delays exacerbate the problem.

There is also at least one automated system in use for docking space vehicles. This system (known as the KURS system) is employed by Russian-built Soyuz and Progress space vehicles in docking with the International Space System (ISS). The KURS system includes an RF beacon signal sent by the ISS and a receiving antenna on the Soyuz vehicle. The Soyuz antenna is mechanically spun about an axis and the received signal from the beacon will be constant if the beacon signal originates on the docking axis. The received signal will be amplitude modulated at approximately 4% for every degree the beacon signal is off-axis. As can be appreciated, the Soyuz vehicle can thus be controlled to keep the beacon (and thus the ISS) on axis via a control loop that controls the Soyuz vehicle to move in a direction to minimize the amount of amplitude modulation in the signal. An additional complement of similar equipment provides similar measurements from the ISS perspective. Additionally, there is a set of antennas and electronics that separately perform round trip range and range rate measurements.

In addition to radar and vision systems, various laser-ranging systems have been proposed and developed. Unfortunately, such systems suffer in their maximum working range. Most, if not all, such systems may only be useable within a range of less than 1 to 2 kilometers while RF-based systems may be usable in the 40 to 60 kilometer range or more. Since it is desirable to minimize the weight of equipment employed on space vehicles, it may be counterproductive to have an optical system with such a limited working range that a secondary system is also required for greater distances.

The problems of limited range and other problems associated with current systems are exacerbated by the fact that at any given moment the exact location of an orbiting vehicle such as the ISS may have a great deal of uncertainty associated therewith. This uncertainty can result from the fact that the ISS is moving at 17,000 MPH or 7.6 meters per millisecond, so it can be appreciated that position estimates are more difficult with this change in position per unit time. Further, the uncertainty is affected by the irregular orbit of the ISS due to gravity variations. Since the mass of the earth is not uniformly distributed, the gravitational force experienced by an orbiting space vehicle is not constant. This causes the radius of the ISS' orbit to vary, as do solar events and other environmental factors. This variation in the orbital radius is particularly a factor for low earth objects such as the ISS.

A Japanese system known as ETS-7 was tested in 1998 with two satellites in space. The system included a combination of a GPS receiver, laser radar (with a pulsed laser), and a proximity sensor. The GPS receiver assisted with position locating from a range of 10 km in to 600 m, the laser radar was used from 660 m in to 2 m, and the proximity sensor was used inside of 2 m. The proximity sensor included approximately 100 LEDs and a CCD camera.

All of the above challenges must be considered in light of the potentially disastrous consequences that could occur if a mishap takes place during a docking procedure. As can be appreciated, the consequences can vary from injury to the occupants of the space vehicles to damaging very expensive equipment for which great expense has been incurred to place them in orbit.

It is against this background and with a desire to improve on the prior art that the present invention has been developed.

SUMMARY OF THE INVENTION

In view of the foregoing, a broad objective of the present invention is to facilitate automated docking of space vehicles. Another objective of the present invention is to remove human operators from the docking procedure. Another objective is to increase the safety of the crew and equipment contained in the space vehicles.

In carrying out these and other objectives, features, and advantages of the present invention, a system for assisting in the automated docking of two space vehicles is provided, wherein one space vehicle is a target vehicle and the other is a chase vehicle. The system includes three antennas located at spaced-apart positions on a first one of the target vehicle and the chase vehicle, an antenna located on a second one of the target vehicle and the chase vehicle, and an RF transmitter contained within the second vehicle, the transmitter being connected to the antenna located on said the second vehicle, the transmitter transmitting RF signals via the antenna. The system also includes three RF receivers contained within the first vehicle, each of the three receivers being connected to a different one of the three antennas located on the first vehicle, at least one of the receivers receiving RF signals from the transmitters via the antennas, and a processor receptive of signals received by the receivers. The transmitter transmits RF signals via the antennas on each vehicle to one or more of the three receivers and wherein the processor is operative to determine, based on the received signals, the range and angular position of the chase vehicle with respect to the target vehicle.

The system may further include a communication link between the chase vehicle and the target vehicle. The communication link may include a transmitter and antenna on the first vehicle and a receiver and antenna on the second vehicle. The system may further include one or more video cameras located on the first vehicle containing the transmitter of the communication link and the communication link may pass information including video information to the second vehicle. Command information relating to at least one of the video cameras may be passed via the communication link. The command information may include a signal related to whether the chase vehicle should continue the docking process.

The system may further include one or more video cameras located on one of the vehicles and video information from the video cameras may be passed to the other vehicle. The video information passed from the other vehicle may be displayed in the other vehicle. The RF signals may be L-Band RF signals. Each of the transmitters may transmit a differently-encoded RF signal than the other transmitters. Each of the receivers may simultaneously receive RF signals from each of the transmitters.

The second vehicle may further include at least two more antennas located thereon and two more RF transmitters contained therewithin and further wherein the three transmitters may transmit RF signals to each of the three receivers and the processor may be further operative to determine, based on the received signals, the relative angular attitudes of the two vehicles. The first vehicle may also include an RF transmitter to send information to the second vehicle, the information including a known repeating code and the second vehicle may further include an RF receiver to receive the information and the three transmitters in the second vehicle send the known repeating code back to the first vehicle. The RF transmitter in the first vehicle may send RF signals at a different RF frequency than does the RF transmitter in the second vehicle. The frequency of the RF signals sent from the fist vehicle may be in the S-Band and the frequency of the RF signals sent from the second vehicle in the L-Band. The frequency of the RF signals sent from the first vehicle compared to the RF signals sent from the second vehicle may be a ratio of natural numbers that are each less than 1000.

The first vehicle may also include a fourth antenna located thereon and a fourth RF receiver contained therewithin and the second vehicle may further include three more antennas located thereon and three more RF transmitters contained therewithin, the four transmitters transmitting RF signals to each of the four receivers and the processor determining, based on the received signals, the relative angular attitudes of the two vehicles.

Another aspect of the present invention relates to a system for assisting in the automated docking of two space vehicles, one being a target vehicle and the other being a chase vehicle. The system includes three antennas located at spaced-apart positions on the target vehicle, three antennas located at spaced-apart positions on the chase vehicle, and three RF transmitters and one RF receiver contained within a first one of the vehicles, each of the three transmitters being connected to a different one of the three antennas located on the first vehicle, the three transmitters transmitting RF signals via the antennas, and the receiver being connected to one of the three antennas. The system also includes three RF receivers and one RF transmitter contained within the second one of the vehicles, each of the three receivers being connected to a different one of the three antennas located on the second vehicle, at least one of the receivers receiving RF signals from the transmitters via the antennas, and the transmitter being connected to one of the three antennas, and a processor receptive of signals received by the receivers in the second vehicle. The transmitter in the second vehicle sends RF signals to the receiver in the first vehicle and then the three transmitters in the first vehicle transmit RF signals via the three antennas on each vehicle to one or more of the three receivers and the processor is operative to determine, based on the received signals, the angular position and attitude of the chase vehicle with respect to the target vehicle.

Another aspect of the present invention relates to a system for assisting in the automated docking of two space vehicles, one being a target vehicle and the other being a chase vehicle. The system includes four antennas located at spaced-apart positions on the target vehicle, four antennas located at spaced-apart positions on the chase vehicle, and four RF transmitters and one RF receiver contained within a first one of the vehicles, each of the four transmitters being connected to a different one of the four antennas located on the first vehicle, the four transmitters transmitting RF signals via the antennas, and the receiver being connected to one of the four antennas. The system also includes four RF receivers contained within a second one of the vehicles, each of the four receivers being connected to a different one of the four antennas located on the second vehicle, at least one of the receivers receiving RF signals from the transmitters via the antennas, and the transmitter being connected to one of the four antennas and a processor receptive of signals received by the receivers in the second vehicle. The transmitter in the second vehicle sends RF signals to the receiver in the first vehicle and then the four transmitters transmit RF signals via the four antennas on each vehicle to one or more of the four receivers and the processor is operative to determine, based on the received signals, the angular position and attitude of the chase vehicle with respect to the target vehicle.

Another aspect of the present invention relates to a system for accurately determining the position of a maneuverable vehicle relative to an object. The system includes three antennas located at spaced-apart positions on a first one of the maneuverable vehicle and the object, an antenna located on a second one of the maneuverable vehicle and the object, and an RF transmitter located on the second one, the transmitter being connected to the antenna located on the second one, the transmitter transmitting RF signals via the antenna. The system also includes three RF receivers located on the first one, each of the three receivers being connected to a different one of the three antennas located on the first one, at least one of the receivers receiving RF signals from the transmitters via the antennas, and a processor receptive of signals received by the receivers. The transmitter transmits RF signals via the antennas on each of the first one and the second one to one or more of the three receivers and wherein the processor is operative to determine, based on the received signals, the range and angular position of the maneuverable vehicle with respect to the object.

Another aspect of the present invention relates to a system for assisting in the automated docking of two space vehicles, one being a target vehicle and the other being a chase vehicle. The system includes a plurality of software defined radios on the target vehicle, wherein the software defined radios are controllable to perform the functions of receiving and decoding GPS signal from the constellation of GPS satellites and the functions of transmitting and receiving TDRSS data to and from the constellation of TDRSS satellites, and a plurality of antennas on the target vehicle associated with the plurality of software defined radios on the target vehicle. The system also includes a plurality of software defined radios on the chase vehicle, wherein the software defined radios are controllable to perform the functions of receiving and decoding GPS signal from the constellation of GPS satellites and the functions of transmitting and receiving TDRSS data to and from the constellation of TDRSS satellites, and a plurality of antennas on the chase vehicle associated with the plurality of software defined radios on the chase vehicle. The software defined radios on both the target vehicle and the chase vehicle are also controllable to perform a function of determining the range between and the relative angular attitude of the vehicles.

Another aspect of the present invention relates to a system for assisting in the automated docking of two space vehicles, one being a target vehicle and the other being a chase vehicle. The system includes one or more antennas located on a first one of the target vehicle and the chase vehicle, an antenna located on a second one of the target vehicle and the chase vehicle, and an RF transmitter contained within the second one of the vehicles, the transmitter being connected to the antenna located on the second vehicle, the transmitter transmitting RF signals via the antenna. The system also includes one or more RF receivers contained within the first one of the vehicles, each of the receivers being connected to a different one of the antennas located on the first vehicle, at least one of the receivers receiving RF signals from the transmitters via the antennas, and a processor receptive of signals received by the receivers. The transmitter transmits RF signals via the antennas on each vehicle to the receivers and wherein the processor is operative to determine, based on the received signals, the range and angular position of the chase vehicle with respect to the target vehicle from a range of 50 km on into docking.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with space vehicles, it should be expressly understood that the present invention may be applicable to other applications where positioning two or more objects in an automated fashion is required/desired. In this regard, the following description of an automated docking system for space vehicles is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
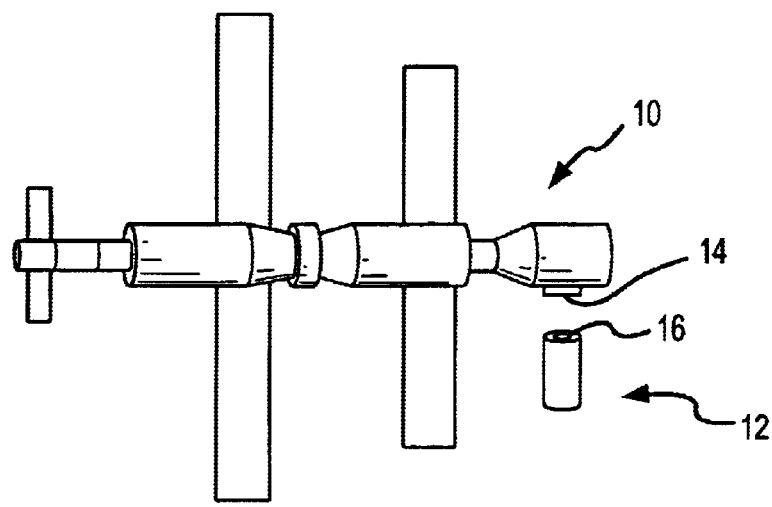
FIG. 1 is a representation of a pair of space vehicles in close proximity to each other using the automated docking system of the present invention.
Figure 2:
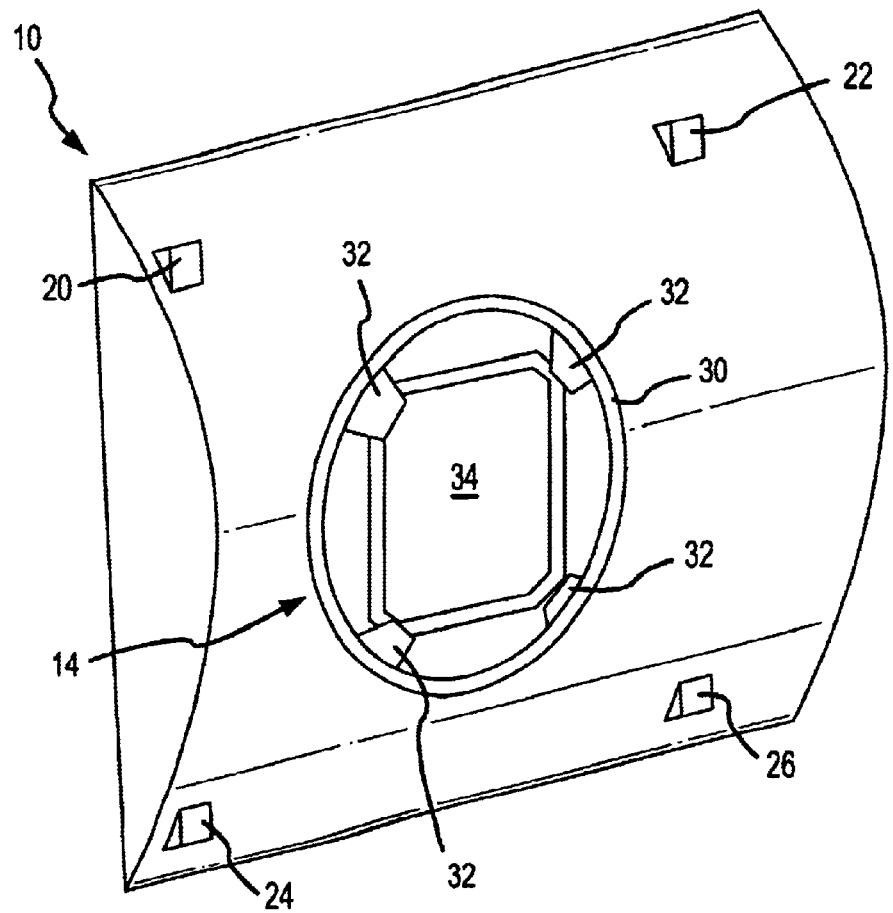
FIG. 2 is a perspective view of a portion of the automated docking system of FIG. 1, showing a docking port on a space vehicle, designated as the target vehicle.
Figure 3:
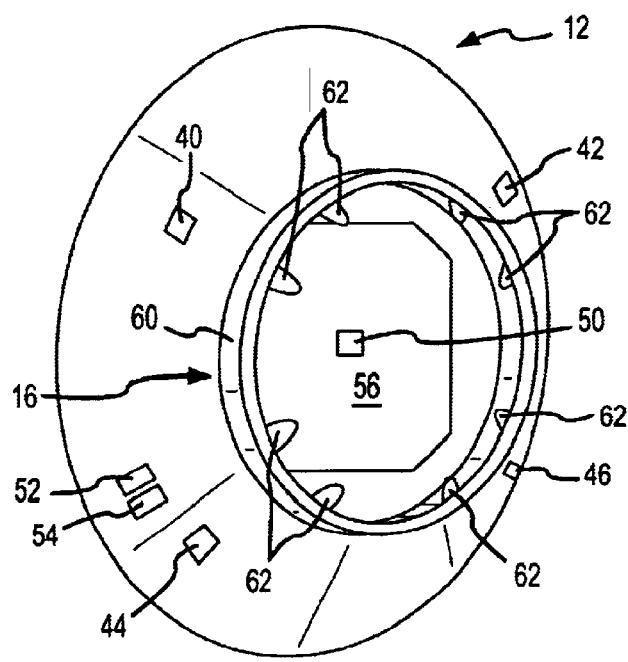
FIG. 3 is a perspective view of a portion of the automated docking system of FIG. 1, showing a docking port on a space vehicle, designated as the target vehicle.

The methods and system of the present invention may be applied to the situation of a target vehicle 10, such as an orbiting space station (e.g. the International Space Station (ISS)), that is being approached by a chase vehicle 12 so that the chase vehicle 12 can eventually dock with the target vehicle 10. The chase vehicle 12 is shown in close proximity of the target vehicle 10 in FIG. 1. A portion of the target vehicle 10 is shown in FIG. 2, including an exemplary docking port 14 on the target vehicle 10. A portion of the chase vehicle 12 showing a docking port 16 thereon is shown in FIG. 3.

It should first be stated that in order to dock a chase vehicle launched from the earth with an orbiting target vehicle such as the ISS, the chase vehicle first goes through a launch phase, then a rendezvous stage, and then a proximity operations phase. The launch phase includes the chase vehicle being launched by a launch vehicle to an intermediate altitude and orbit. Once the chase vehicle separates from the launch vehicle, it enters the rendezvous stage in which a series of propulsive maneuvers are made to move it into an altitude and orbit near that of the ISS. During this time, these movements are in part based on utilizing the GPS system to determine the chase vehicles position and using stored information of the ISS location together with TDRSS (Tracking and Data Relay Satellite System) information and information communicated from ground stations. During much of the rendezvous stage, the chase and target vehicles are so far apart that direct communication between the vehicles will typically not be possible due to blockage by the earth. This is the case since the low earth orbit (LEO) of the ISS is at a height of approximately 200 miles above sea level of the earth, while the earth's radius is approximately 4000 miles. Upon reaching the proximity of the target vehicle, direct communication is possible and the proximity operations phase is entered. This phase is discussed more specifically below.

As is shown in FIG. 2, four antennas 20, 22, 24, and 26 are located on the exterior of the target vehicle 10 in the vicinity of the docking port 14. As is shown, the antennas are equally spaced from and in a generally rectangular pattern with respect to the docking port 14. This is not a requirement, as different numbers of antennas may also be suitable, such as three antennas on each vehicle or more than four antennas on each vehicle. Furthermore, it is also within the scope of the present invention to have the antennas located in a different pattern with respect to the docking port 14. It has been found that antenna patterns which fall in a single plane and which form right angles simplify calculation methods.

The docking port 14 in FIG. 2 can be seen to include an O-ring assembly 30 that mates with portions of the docking port 16 of the chase vehicle 12. A plurality of guide members 32 are also defined on the docking port 14 for correctly positioning the docking ports 14 and 16 relative to each other. The port 14 also includes a door assembly 34 that can be removed to allow personnel or equipment to pass through the port 14. Although not shown, the door assembly 34 may include a window as a portion thereof to allow personnel to view the approaching chase vehicle 12 directly or via a camera that may be provided.

The docking port 16 on the chase vehicle 12 is shown in further detail in FIG. 3. As can be seen, a plurality of antennas, in this case four antennas 40, 42, 44, and 46 are provided in a spaced-apart pattern around the docking port 16. Four antennas is not a requirement, as different numbers of antennas may also be suitable, such as three antennas or more than four antennas. Furthermore, it is also within the scope of the present invention to have the antennas located in a different pattern with respect to the docking port 16 or in patterns on the two docking ports 14 and 16 that are not aligned.

A plurality of cameras, such as cameras 50, 52, and 54 may also be provided on the chase vehicle 12. Each of the cameras 50, 52, and 54 may provide a video image of the target vehicle 10 from the vantage point of the chase vehicle 12 as it approaches the target vehicle. One camera 50 may be mounted on a door assembly 56 that, when removed, allows personnel or equipment to be passed through the docking port 16. The other two cameras 52 and 54 may be located off to one side of the port 16 to give a different perspective. In this case, the two cameras 52, 54 are off to the side and may be provided with different optical systems to provide different magnification so that both a wide-angle and a close-up view may be available. The docking port 16 also includes a protruding lip assembly 60 that is designed to engage with the O-ring assembly 30 of the docking port 14 on the target vehicle. The protruding lip assembly 60 includes a plurality of pairs of fingers 62, in this case four pairs of fingers 62. The fingers 62 are shaped and positioned so as to come in contact with the guide members 32 of the docking port 14 of the target vehicle 10. In this manner, if the target vehicle 10 and chase vehicle 12 are slightly misaligned with respect to each other at the moment that they come into contact, the fingers 62 and guide members 32 will cause one or both of the vehicles 10, 12 to reorient slightly so as to become better aligned. Once the two ports 14 and 16 are engaged, a plurality of machine-driven bolts (not shown) on one or both of the ports can be driven into engagement with the other port. Alternatively, the system of the present invention could be equally applicable to other types of docking and berthing mechanical systems. Some such mechanical systems may be more suitable for docking and some for berthing. Various mechanical systems may have different approach/engagement requirements, such as the relative speed and misalignment tolerance of the vehicles at the moment of docking or berthing.

At times, a distinction is made in the art between berthing one vehicle relative to another and docking one vehicle to another. When this distinction is made, docking refers to the final engagement of the two vehicles together, while berthing refers to the initial engagement of one vehicle by another such as when a chase vehicle comes within sufficiently close proximity of a target vehicle so that the target vehicle can grasp the chase vehicle with a robot arm and then complete the final docking.

Figure 4:
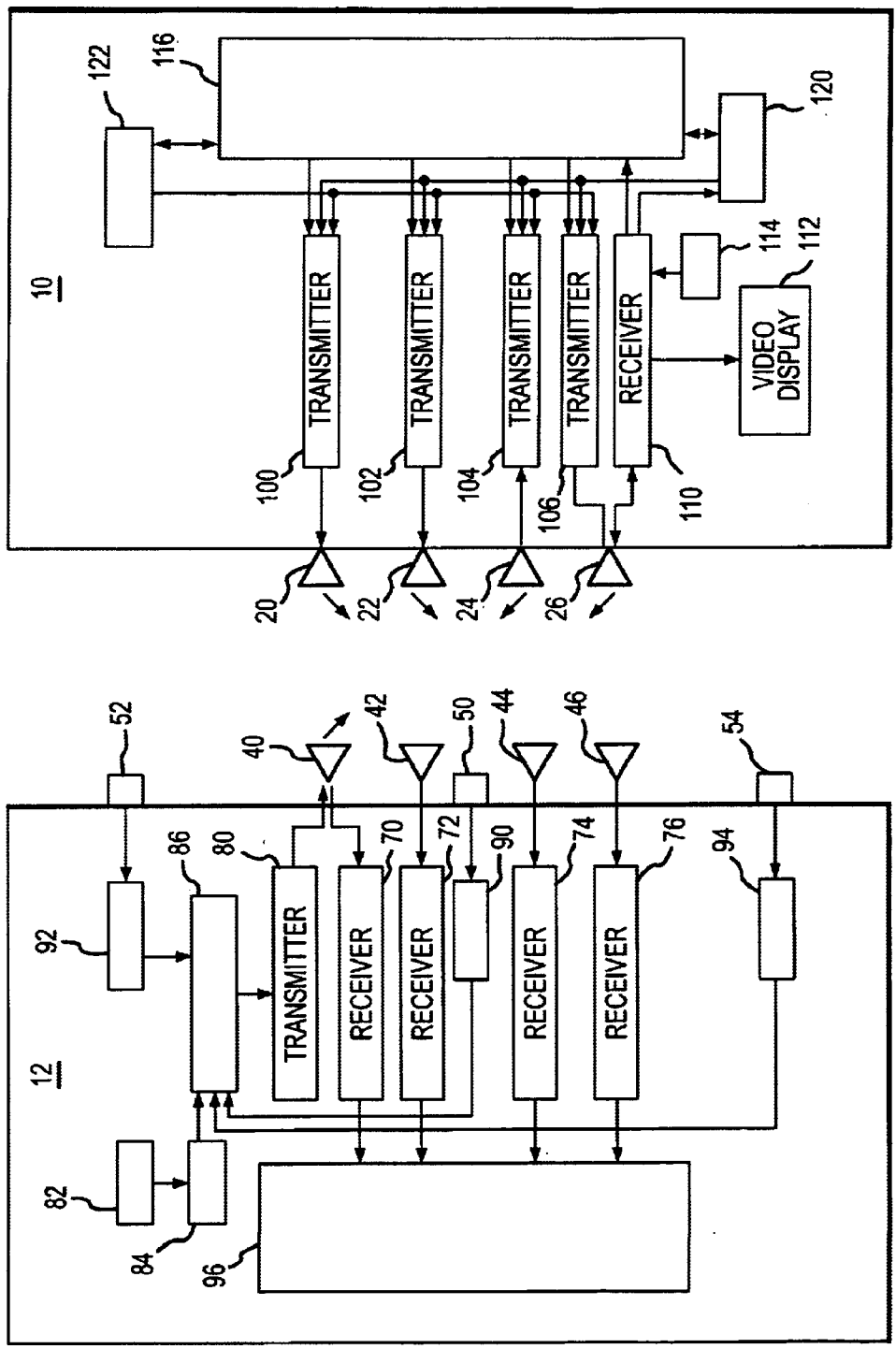
FIG. 4 is a block diagram of the automated docking system of FIG. 1, showing selected major components thereof.

A block diagram of major components of the system of the present invention that determines the range between, the range rate, and the relative attitudes (pitch, roll, and yaw) of the target vehicle 10 and chase vehicle 12 is shown in FIG. 4. The four antennas 20, 22, 24, and 26 are shown on the exterior of the target vehicle 10 and the four antennas 40, 42, 44, and 46 and the three cameras 50, 52, and 54 are shown on the exterior of the chase vehicle 12. Each of the four antennas 40, 42, 44, and 46 on the chase vehicle 12 are configured to receive L-Band RF signals and provide same to a separate one of four receivers 70, 72, 74, and 76 that are each associated with one of the antennas 40, 42, 44, and 46.

One of the antennas, in this case the antenna 40, is also configured to transmit S-Band RF signals and has an S-Band transmitter 80 attached thereto. A 10 MHz oscillator 82 provides a signal to a frequency multiplier 84 that, in turn, provides a signal to a spread-spectrum carrier spreader 86. The carrier spreader 86 provides a signal to the transmitter 80, which provides a RF signal to the antenna 40. As will be discussed in further detail below, the RF signal sent via the transmitter 80 includes ranging information as well as video information from the three cameras 50, 52, and 54 via associated video compressors 90, 92, and 94. Each of the receivers 70, 72, 74, and 76 provide a separate output to a processor 96.

In the target vehicle 10, there is a separate one of four separate L-Band transmitters 100, 102, 104, and 106 associated with the four antennas 20, 22, 24, and 26 on the target vehicle 10. Also associated with one of the antennas 20, 22, 24, and 26, in this case the antenna 26, is an S-Band RF receiver 110 that receives the S-Band RF signal transmitted by the antenna 40 on the chase vehicle 12. The receiver 110 routes one or more received video signals taken by one of the cameras 50, 52, and 54 on the chase vehicle 12 to a video display 112 located in the target vehicle 10. The receiver 110 receives a signal from a 10 MHz oscillator and frequency multiplier 114 in the target vehicle. The receiver 110 also communicates with a processor 116 located in the target vehicle 110. The received ranging information from the chase vehicle 12 is provided by the receiver 110 to a spread-spectrum, coherent frequency ratio, carrier spreader 120 that provides a signal to each of the RF transmitters 100, 102, 104, and 106 in the target vehicle 10. Each of the transmitters 100, 102, 104, and 106 also receive signals from the processor 116 and a command block 122 where command data for the other vehicle can be introduced.

In a manner that will be described in further detail below, a coded signal is sent from the chase vehicle 12 via antenna 40 thereon to the target vehicle 10 via antenna 26 thereon and the same coded signal is sent back from the target vehicle 10 to the chase vehicle 12 at a different frequency via antennas 20, 22, 24, 26 on the target vehicle 10 and antennas 40, 42, 44, and 46 on the chase vehicle 12. The coded signal received back by the chase vehicle 12, after a round trip passage to the target vehicle 10 and back, via solely antennas 26 and 40 can be used by the chase vehicle 12 to accurately calculate the round trip time of transit between those two antennas 26 and 40. From that, the one-way range between antennas 26 and 40 can be calculated. Once this is known, the range between each of the antennas on the target vehicle 10 and each of the antennas on the chase vehicle 12 can be calculated. With this information, it is possible to calculate the range between the vehicles, the change in range per unit of time between the vehicles (known as the range rate), and the relative angular orientation between the two vehicles 10 and 12 (also known as the angular direction and attitude of the two vehicles). The reported range between the vehicles is the range from a midpoint between the antennas on one vehicle to a midpoint between the antennas on the other vehicle. Doppler range rate measurements can also be accomplished.

Figure 5:
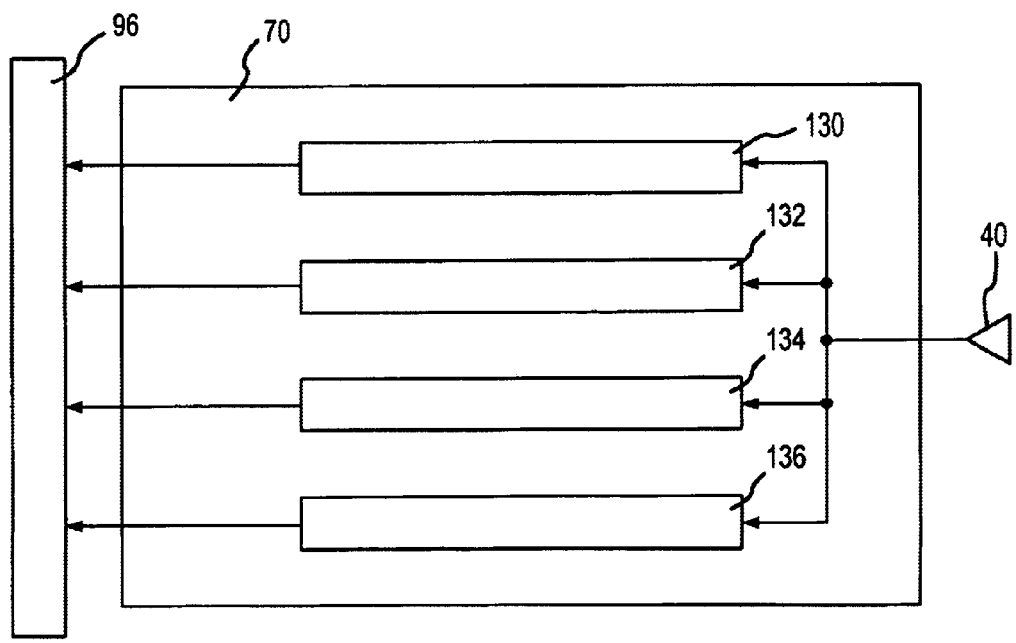
FIG. 5 is a block diagram of an antenna, RF receiver, and processor of the automated docking system of FIG. 1, showing selected major components thereof.

Further detail on the receiver 70 and the chase vehicle 12 is provided in FIG. 5. Although only one of the receivers 70, 72, 74, and 76, are shown, receiver 70 is exemplary of the others. As can be seen, the RF signal from the antenna 40 is provided to four different code correlators 130, 132, 134, and 136 within the receiver 70. Since each of the transmitters 100, 102, 104, and 106 in the target vehicle 10 have returned the code initially sent by the chase vehicle 12 in a different coded format, each of the code correlators 130, 132, 134, and 136 looks for a different one of the four transmitted codes. Information related thereto is provided from the code correlators 130, 132, 134, and 136 to the processor 96.

Figure 6:
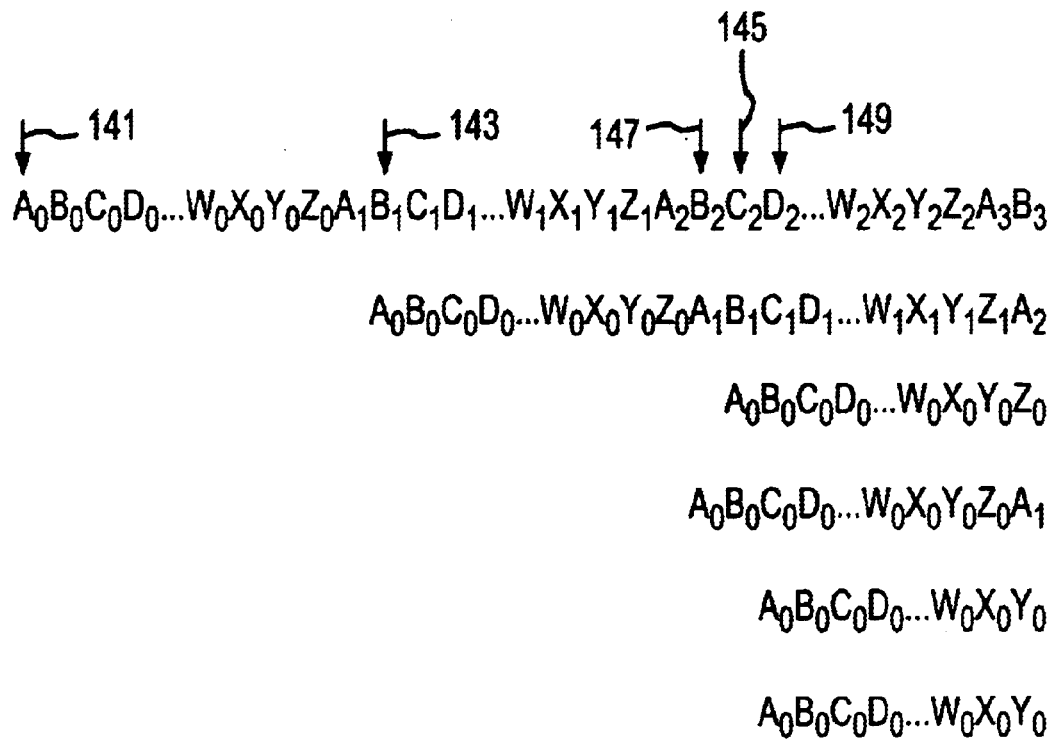
FIG. 6 is a timing chart of six different codes when transmitted or received, showing the timing relationships therebetween.

FIG. 6 shows a greatly simplified code pattern that is exemplary of aspects of the present invention. In actuality, the code initially sent from the chase vehicle 12 to the target vehicle 10 may be at 2.25 GHz and may use a pseudo random code that is known to be used by what is known as "vehicle 5" in the well-known global positioning system (GPS). The return signals sent by the target vehicle 10 to the chase vehicle 12 may each be 1.57 GHz signals. In this case, the frequencies 2.25 GHz and 1.57 GHz are related to each other as the ratio of two natural numbers (225 and 157). Since the ratio is between two natural numbers and the numbers are less than one thousand, for example, it can be appreciated that in the time period for a 10 MHz sine wave to complete exactly one cycle (0.1 microseconds) or a 10 MHz PRN generator to complete exactly one code state (0.1 microseconds), the 2.25 GHz carrier will complete exactly 225 cycles and the 1.57 GHz carrier will complete exactly 157 cycles. This allows the return RF signals from the target vehicle 10 to the chase vehicle 12 to be at a different frequency as desired but allow for the signals to be coherently related. Then, each of the four transmitters on the target vehicle 10 sends a differently encoded signal, using the pseudo random codes known as "vehicle 1," "vehicle 2," "vehicle 3," and "vehicle 4" in the GPS system.

The simplified coding system shown for ease of illustration in FIG. 6 shows a code 140 represented by values $A_0$, $B_0$, $C_0$, $D_0$ on through $W_0$, $X_0$, $Y_0$, $Z_0$. This portion of the code 140 is followed by another twenty-six values represented as $A_1$ through $Z_1$, followed by another twenty-six values represented as $A_2$ through $Z_2$, and so forth. In this example, this first code 140 is sent out from the chase vehicle 12 via the transmitter 80 and antenna 40. After some time delay due to the electronics and propagation delay, the code 140 is received by the receiver 110 in the target vehicle 10, the received timing of the code being represented by 142. This time delay is represented in FIG. 6 by the time difference (horizontal distance in FIG. 6) between the epoch of the code 140 as represented by arrow 141 and the epoch of the code 142 as represented by arrow 143.

As described previously, the received code 142 is coherently transmitted by the target vehicle 10 back to the chase vehicle 12 via the four transmitters 100, 102, 104, and 106. In doing so, each of these four transmitters further encodes the received code and sends it at L-Band frequency. As was also described previously, each of the receivers 70, 72, 74, and 76 in the chase vehicle 12 receive all four of the transmitted codes from the target vehicle 10. FIG. 6 shows a representation of the four received codes 144, 146, 148, and 150 (and their epochs 145, 147, and 149) received by just one of those receivers 70, 72, 74 and 76, for example receiver 70. As described previously, each of the code correlators 130, 132, 134, and 136 in the receiver 70 is configured to look for a different one of the codes from the transmitters 100, 102, 104, and 106 in the target vehicle 10. One of the code correlators 130 finds the first code 144, which has an epoch represented by the arrow 145 in FIG. 6. Similarly, others of the code correlators 132, 134, and 136 receive a code 146 with an epoch as represented by the arrow 147, a code 148 with an epoch as represented by the arrow 149, and a code 150 with an epoch that in this case is identical to that of the code 144 and thus the epoch is at the time already indicated by the arrow 145.

In this simplified example, the processor 96 can calculate the time delay from the epoch 141 to the epoch 145, then perform further processing such as subtracting out known delays due to electronics, and come up with a time delay due to the distance between the respective antennas on the chase vehicle 12 and the target vehicle 10. A similar calculation can be made for each of the four codes and, accordingly, the distance or range from the antenna 40 to each of the antennas 20, 22, 24, and 26 on the target vehicle 10 can thus be determined. Code correlators in the other three receivers 72, 74, and 76 behave similarly and allow the processor 96 to determine the range from each of the four antennas 40, 42, 44, and 46 on the chase vehicle 12 to each of the four antennas 20, 22, 24, and 26 on the target vehicle 10.

It can be appreciated that with the chase vehicle 12 knowing precisely the range, range rate, and relative attitudes between the two vehicles 10 and 12, the chase vehicle 12 can make the desired propulsive maneuvers via its thrusters to orient the vehicles 10 as desired. Range rate can also be calculated or confirmed/validated by measuring Doppler frequency shift of reflected RF signals.

The video information from the video processors 90, 92, and 94 is sent to the target vehicle 10 via a 10 Mbps data stream. The data stream may typically provide two video streams (any two of however many cameras may be available). This provides personnel on the target vehicle 10 with situational awareness so as to know whether it is safe for the docking procedure to proceed. The data stream may also include other telemetry such as which camera the provided video information is coming from, temperature, thruster information, attitude information, and so forth. The 10 Mbps data stream is sent via the transmitter 80 with Quaternary Phase Shift Keying (QPSK) modulation with one pair of states in the QPSK signal containing the pseudo random code described above and the other pair of states containing the 10 Mbps data stream. Alternatively, other types of modulation, particularly unbalanced types such as USQPSK could be used. This may increase the video portion of the communication link.

All four of the transmitters 100, 102, 104, and 106 on the target vehicle 10 will typically include a 2 kbps command data stream. These data streams may include a consent-to-continue command, without which the chase vehicle 12 may move away from the target vehicle 10 to a safe distance. The command data stream may also include commands relating to the cameras or which cameras video stream to send. It may also be desirable to command, over the command data stream, the chase vehicle 12 flash various lights in specified positions or colors for the personnel in the target vehicle 10 to confirm things.

With an RF link (from antenna 40 to antenna 26) from the chase vehicle 12 to the target vehicle and essentially sixteen RF links (from each of antennas 40, 42, 44, and 46 to each of antennas 20, 22, 24, and 26) from the target vehicle 10 to the chase vehicle 12, it is possible for sixteen distance measurements between the vehicles 10 and 12 to be made. Only nine are required to determine the attitude of the vehicles 10 and 12 relative to each other. This provides six degree of freedom distance, orientation, and redundant velocity information. Having sixteen measurements instead of the required nine provides for further redundancy which increases the level of fault tolerance.

Although the present invention is not limited to any particular geometric arrangement of the antennas or to particular distances between the antennas, the following arrangements have been found to be suitable from preliminary testing. The antennas 20, 22, 24, and 26 on the target vehicle 10 may be arranged in a rectangle as shown in FIG. 2 with approximately 115.7 inches between antennas 20 and 22 and between antennas 24 and 26 and with approximately 107.8 inches between antennas 20 and 24 and between antennas 22 and 26. The antennas 40,42,44, and 46 on the chase vehicle 12 may be equally spaced apart and arranged on a circle with radius of approximately 49 inches, the circle being coaxial with the circular docking port 16 which has a radius of approximately 24 inches.

It should be made clear that, although this embodiment describes the chase vehicle 12 as sending out the code which is returned by the target vehicle 10 to the chase vehicle 12 and then the chase vehicle 12 processes this information and maneuvers itself as desired, various other arrangements of the equipment, processing, and maneuvering also fall within the scope of the present invention. By way of example only, the code could originate from the target vehicle 10, be received by the chase vehicle 12 and be sent back to the target vehicle 10. Also, the target vehicle 10 could do the processing under either arrangement. Further, there may only be a link in one direction, possibly because the code can be generated simultaneously by both vehicles, one for transmission by one vehicle and the other for comparison to the received code to determine the ranges. Also, the target vehicle could make the final maneuvers. Also, the target vehicle or the chase vehicle could use a mechanical means such as a robot arm to grab the other vehicle and pull the two together.

Another important aspect of the present invention is that much of it can be implemented in the target and chase vehicles in what are now known as software-defined or software-programmable radios. These radios are re-configurable, multi-purpose radio systems. Further information on such radios can be found in "Software Radio Technologies: Selected Readings" edited by Joseph Mitolam and Zoran Zvonar (ISBN 0-7803-6022-2; IEEE Press and John Wiley & Sons, Inc. 2001), the contents of which are incorporated herein by reference. In this manner, many of the same components described above on the target and chase vehicles may be also utilized for TDRSS (Tracking and Data Relay Satellite System) and/or GPS functions. In addition, it should be understood that due to the importance of the docking portion of the chase vehicle's mission, there would typically be sufficient redundancy in all of the above-described equipment to allow the docking procedure to be accomplished in the presence of equipment failures. For example, some of this redundant equipment can be used by the chase and target vehicles to maintain TDRSS and GPS communication while performing the docking procedure. Should a failure occur, then the TDRSS and GPS functions can be temporarily terminated or diminished to allow the docking procedure to proceed. For example, the equipment in the target vehicle 10 may include the four antennas, coaxial cable, an oscillator, a software-programmable radio in the form of a pair of circuit cards (one RF and one digital, although the circuitry could be arranged in any other manner on one or more cards), a housing, and optionally a connection or equipment for command authority and/or a video display. The equipment in the chase vehicle 12 may include the four antennas, coaxial cable, an oscillator, a software-programmable radio in the form of a pair of circuit cards (with two redundant pairs for dual fault redundancy), and a housing. The oscillators may be 10 MHz precision oscillators that the software-programmable radios can use to create/synthesize other frequencies. The chase vehicle radio equipment connects to a flight computer of the chase vehicle via Ethernet although various other interface techniques could be used (e.g., MIL-STD-1553, RS-422, IEEE-1394, and so forth). The flight computer contains the autopilot which drives the propulsion system, which in turn puts the vehicle in motion, closing the distance between the vehicles in accordance with applicable approach guidelines, maintaining safe closing velocity, and allowing for automatic collision avoidance maneuvers if failures or abort commands occur (also known as revoking consent-to-continue or wave-off).

By using relatively low power (1 mW or less per transmitter), spread spectrum RF signals, interference with other equipment on the vehicles is minimized. Multi-path concerns (relating to RF signals taking alternate paths between antennas due to reflections off of vehicle structures) are alleviated by a high code-spreading rate (e.g., the 10 M chip per second GPS L5 spreading rate). Furthermore, the antenna beamwidth, placement, and type are selected to reduce multi-path issues. This may include choke ring designs and stealth technology RF absorber materials.

The accuracy of the system of the present invention was predicted to be better than two feet in range and better than ten degrees in attitude at the time of docking/berthing, based on modeling. Preliminary testing thus far has shown the system to have an accuracy of better than one cm and better than one degree via carrier-aided tracking (if the carrier wave cycle ambiguity is resolved with pseudo range) or approximately two to five feet of accuracy with pseudo range alone, although the pseudo range data may have been adversely affected by the test set-up. By performing sub-carrier wavelength measuring, greater accuracy can be achieved than by simply timing the round trip propagation time. Such techniques for sub-carrier wavelength measuring may include carrier aided tracking. Since carrier aided tracking has a phase ambiguity associated therewith, however, it may be desirable to also use pseudo range or coded tracking to resolve the ambiguity.

It can be appreciated that the system of the present invention is preferable to differential GPS for several reasons. First of all, differential GPS requires a fixed GPS receiver at a precisely known location that is nearby the differential GPS receiver. The fixed receiver communicates information to the differential GPS receiver that allows it to subtract out much of the usual errors. Since there is not a nearby fixed GPS receiver at a precisely known location, differential GPS is not easily applicable here. Relative GPS techniques can be utilized for rendezvous, but are not of sufficient accuracy to support docking or berthing operations. Second, rather than relying on a far-away constellation of satellites from which the system can receive information to be used for position locating, the present system can rely on locally generated signals from the other vehicle.

The embodiments described thus far have related to the docking together of two potentially maneuverable space vehicles. It should be understood that the present invention would be also be applicable to a maneuverable chase vehicle that seeks to capture a ballistic object launched from a celestial body or another spacecraft. This object may a transport vessel with little to no electronics thereon and little to no ability to control its movement. The object could be a sphere or other suitably-shaped object filled with material to be provided to the chase vehicle or other vehicle. The object might then be launched in the vicinity of the chase vehicle. With the provision of a suitable number of antennas/receivers/transmitters on the object, the teachings of the present invention could be employed to guide the chase vehicle to capture the object, in this case the target vehicle. Thus, it can be appreciated that while the vehicle or object to be captured will be "cooperative" in that it will have the ability to transmit a coherent pseudo random code, it need not be a maneuverable space vehicle.

While the present invention has been described with regard to the automated docking or capture of space vehicles, the present invention is also applicable to other situations where it is desirable to accurately position one object relative to another object in space, or on the earth or any other celestial body. By way of non-limiting example, the present invention could also apply to formation flying of space vehicles, maneuvering one space vehicle across the complex structure of another vehicle (such as the ISS), all types of land vehicles including cars, trucks, and railroad cars, and to all types of nautical vehicles.

The present invention could be utilized to precisely guide entry vehicles approaching for example a moon base or a Mars exploration site, situations where there is not currently an available Global Positioning System. In the latter case, the target receiver/transmitter elements may be ballistically deployed and remotely located prior to the entry vehicle's arrival. Once the elements are deployed (e. g. approximate corners of a 1 km×1 km rectangle) and located, they could wait in a low power dormant listen only mode until activated by the entry vehicle beacon. The deployed elements would then allow the entry vehicle to navigate to a very specific/precise landing location.

A moon base landing aid would be similar. A landing pad—conceptually similar to an elevated helicopter landing pad as might be found on an Oil Rig or Emergency services Hospital—would be equipped with the target system allowing a landing craft to precisely land on an established structure.

A helicopter landing pad could be similarly equipped with the target equipment. In inclement "zero-zero visibility" weather, for example the "chase equipped" helicopter would utilize other resources such as GPS to position itself within range of the landing pad communication range. (Perhaps 200 to 500 feet above the landing pad.) Once the links are established the system could provide precise guidance to a safe landing. In this case it may not be necessary to automate the landing, but simply provide to the pilot the information unobtainable due to weather obscuration. Additionally, rescue crews could be equipped with a target set allowing for deployment at the scene of an emergency, allowing for flight operations in confined areas during limited lighting conditions, or inclement weather. Off-shore oil rigs could be accessed more often during fog conditions based on implementation of this invention.

In the railroad car application, a one-dimensional implementation could allow a train to automatically follow another train at a minimum safe distance, with automatic brake initiation on the follower train at any indication from the lead train (e.g., in the case of deceleration, emergency, and so forth). This would allow trains to spend considerably less time idle on sidetracks while waiting for permission/clearance to proceed. At present, train lengths are limited by coupling strength. With the present invention, a convoy of train segments could travel in a more efficient manner. Airport terminal-to-terminal train service could also be improved with the use of the present invention. In such case, more processing could be on the trains themselves instead of having an expensive command center.

On trucks, higher density traffic flow could be achieved with the present invention. Perhaps this would be implemented only on restricted access roads for safety issues.

With ships, a two-dimensional implementation could allow a ship to automatically berth to an easily equipped dock. The link between the ship and the dock could be commenced at a few hundred feet. Due to the unique coding of the spread-spectrum signals, this technique would be relatively immune from sabotage.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A system for assisting in the automated docking of two space vehicles, one being a target vehicle and the other being a chase vehicle, the system comprising:

three antennas located at spaced-apart positions on a first one of the target vehicle and the chase vehicle;

an antenna located on a second one of the target vehicle and the chase vehicle;

an RF transmitter contained within the second vehicle, the transmitter being connected to the antenna located on the second vehicle, the transmitter transmitting RF signals via the antenna;

three RF receivers contained within the first vehicle, each of the three receivers being connected to a different one of the three antennas located on the first vehicle, at least one of the receivers receiving RF signals from the transmitters via the antennas;

a processor receptive of signals received by the receivers;

wherein the transmitter transmits RF signals via the antennas on each vehicle to one or more of the three receivers and wherein the processor is operative to determine, based on the received signals, the range and angular position of the chase vehicle with respect to the target vehicle.

2. A system as defined in claim 1, further including a communication link between the chase vehicle and the target vehicle.

3. A system as defined in claim 2, wherein the communication link includes a transmitter and antenna on the first vehicle and a receiver and antenna on the second vehicle.

4. A system as defined in claim 3, further including one or more video cameras located on the first vehicle containing the transmitter of the communication link and wherein the communication link passes information including video information to the second vehicle.

5. A system as defined in claim 4, wherein command information relating to at least one of the video cameras is passed via the communication link.

6. A system as defined in claim 2, wherein command information is passed via the communication link.

7. A system as defined in claim 6, wherein the command information includes a signal related to whether the chase vehicle should continue the docking process.

8. A system as defined in claim 1, further including one or more video cameras located on one of the vehicles and wherein video information from the video cameras is passed to the other vehicle.

9. A system as defined in claim 8, wherein the video information passed from the other vehicle is displayed in the other vehicle.

10. A system as defined in claim 1, wherein the RF signals are L-Band RF signals.

11. A system as defined in claim 1, wherein each of the transmitters transmits a differently-encoded RF signal than the other transmitters.

12. A system as defined in claim 1, wherein each of the receivers can simultaneously receive RF signals from each of the transmitters.

13. A system as defined in claim 1, wherein the second vehicle further includes at least two more antennas located thereon and two more RF transmitters contained therewithin and further wherein the three transmitters transmit RF signals to each of the three receivers and the processor is further operative to determine, based on the received signals, the relative angular attitudes of the two vehicles.

14. A system as defined in claim 13, wherein the first vehicle also includes an RF transmitter to send information to the second vehicle, the information including a known repeating code and wherein the second vehicle further includes an RF receiver to receive the information and the three transmitters in the second vehicle send the known repeating code back to the first vehicle.

15. A system as defined in claim 1, wherein the first vehicle also includes an RF transmitter to send information to the second vehicle, the information including a known repeating code and wherein the second vehicle further includes an RF receiver to receive the information and the transmitter in the second vehicle send the known repeating code back to the first vehicle.

16. A system as defined in claim 15, wherein the RF transmitter in the first vehicle sends RF signals at a different RF frequency than does the RF transmitter in the second vehicle.

17. A system as defined in claim 16, wherein the frequency of the RF signals sent from the first vehicle are in the S-Band and the frequency of the RF signals sent from the second vehicle are in the L-Band.

18. A system as defined in claim 16, wherein the frequency of the RF signals sent from the first vehicle compared to the RF signals sent from the second vehicle are a ratio of natural numbers that are each less than 1000.

19. A system as defined in claim 1, wherein the first vehicle also includes a fourth antenna located thereon and a fourth RF receiver contained therewithin and further wherein the second vehicle further includes three more antennas located thereon and three more RF transmitters contained therewithin, the four transmitters transmitting RF signals to each of the four receivers and the processor determining, based on the received signals, the relative angular attitudes of the two vehicles.

20. A system for assisting in the automated docking of two space vehicles, one being a target vehicle and the other being a chase vehicle, the system comprising:

three antennas located at spaced-apart positions on the target vehicle;

three antennas located at spaced-apart positions on the chase vehicle;

three RF transmitters and one RF receiver contained within a first one of the vehicles, each of the three transmitters being connected to a different one of the three antennas located on the first vehicle, the three transmitters transmitting RF signals via the antennas, and the receiver being connected to one of the three antennas;

three RF receivers and one RF transmitter contained within the second one of the vehicles, each of the three receivers being connected to a different one of the three antennas located on the second vehicle, at least one of the receivers receiving RF signals from the transmitters via the antennas, and the transmitter being connected to one of the three antennas;

a processor receptive of signals received by the receivers in the second vehicle;

wherein the transmitter in the second vehicle sends RF signals to the receiver in the first vehicle and then the three transmitters in the first vehicle transmit RF signals via the three antennas on each vehicle to one or more of the three receivers and wherein the processor is operative to determine, based on the received signals, the angular position and attitude of the chase vehicle with respect to the target vehicle.

21. A system for assisting in the automated docking of two space vehicles, one being a target vehicle and the other being a chase vehicle, the system comprising:

four antennas located at spaced-apart positions on the target vehicle;

four antennas located at spaced-apart positions on the chase vehicle;

four RF transmitters and one RF receiver contained within a first one of the vehicles, each of the four transmitters being connected to a different one of the four antennas located on the first vehicle, the four transmitters transmitting RF signals via the antennas, and the receiver being connected to one of the four antennas;

four RF receivers contained within a second one of the vehicles, each of the four receivers being connected to a different one of the four antennas located on the second vehicle, at least one of the receivers receiving RF signals from the transmitters via the antennas, and the transmitter being connected to one of the four antennas;

a processor receptive of signals received by the receivers in the second vehicle;

wherein the transmitter in the second vehicle sends RF signals to the receiver in the first vehicle and then the four transmitters transmit RF signals via the four antennas on each vehicle to one or more of the four receivers and wherein the processor is operative to determine, based on the received signals, the angular position and attitude of the chase vehicle with respect to the target vehicle.

22. A system for accurately determining the position of a maneuverable vehicle relative to an object, the system comprising:

three antennas located at spaced-apart positions on a first one of the maneuverable vehicle and the object;

an antenna located on a second one of the maneuverable vehicle and the object;

an RF transmitter located on the second one, the transmitter being connected to the antenna located on the second one, the transmitter transmitting RF signals via the antenna;

three RF receivers located on the first one, each of the three receivers being connected to a different one of the three antennas located on the first one, at least one of the receivers receiving RF signals from the transmitters via the antennas;

a processor receptive of signals received by the receivers;

wherein the transmitter transmits RF signals via the antennas on each of the first one and the second one to one or more of the three receivers and wherein the processor is operative to determine, based on the received signals, the range and angular position of the maneuverable vehicle with respect to the object.

23. A system for assisting in the automated docking of two space vehicles, one being a target vehicle and the other being a chase vehicle, the system comprising:

a plurality of software defined radios on the target vehicle, wherein the software defined radios are controllable to perform the functions of receiving and decoding GPS signal from the constellation of GPS satellites and the functions of transmitting and receiving TDRSS data to and from the constellation of TDRSS satellites;

a plurality of antennas on the target vehicle associated with the plurality of software defined radios on the target vehicle;

a plurality of software defined radios on the chase vehicle, wherein the software defined radios are controllable to perform the functions of receiving and decoding GPS signal from the constellation of GPS satellites and the functions of transmitting and receiving TDRSS data to and from the constellation of TDRSS satellites;

a plurality of antennas on the chase vehicle associated with the plurality of software defined radios on the chase vehicle;

wherein the software defined radios on both the target vehicle and the chase vehicle are also controllable to perform a function of determining the range between and the relative angular attitude of the vehicles.

24. A system for assisting in the automated docking of two space vehicles, one being a target vehicle and the other being a chase vehicle, the system comprising:

one or more antennas located on a first one of the target vehicle and the chase vehicle;

an antenna located on a second one of the target vehicle and the chase vehicle;

an RF transmitter contained within the second one of the vehicles, the transmitter being connected to the antenna located on the second vehicle, the transmitter transmitting RF signals via the antenna;

one or more RF receivers contained within the first one of the vehicles, each of the receivers being connected to a different one of the antennas located on the first vehicle, at least one of the receivers receiving RF signals from the transmitters via the antennas;

a processor receptive of signals received by the receivers;

wherein the transmitter transmits RF signals via the antennas on each vehicle to the receivers and wherein the processor is operative to determine, based on the received signals, the range and angular position of the chase vehicle with respect to the target vehicle from a range of 50 km on into docking.

* * * * *

UNITED STATES PATENT AND TRADEMARK OFFICE
CERTIFICATE OF CORRECTION

PATENT NO.    : 6,866,232 B1
DATED         : March 15, 2005
INVENTOR(S)   : Finney It is certified that error appears in the above-identified patent and that said Letters Patent is hereby corrected as shown below:

<u>Title page,</u>
Item [54], Title, delete "VEHICLE" and insert therefor -- VEHICLES --.

Signed and Sealed this

Fourteenth Day of June, 2005

JON W. DUDAS
*Director of the United States Patent and Trademark Office*